(12) United States Patent
Melkote Krishnaprasad et al.

(10) Patent No.: US 10,796,458 B2
(45) Date of Patent: Oct. 6, 2020

(54) COMPRESSION OF POINT CLOUDS VIA A NOVEL HYBRID CODER

(71) Applicant: QUALCOMM Incorporated, San Diego, CA (US)

(72) Inventors: Vinay Melkote Krishnaprasad, Bangalore (IN); Ajit Venkat Rao, Bangalore (IN); Bojan Vrcelj, San Diego, CA (US); Dieter Schmalstieg, Graz (AT)

(73) Assignee: QUALCOMM Incorporated, San Diego, CA (US)

(*) Notice: Subject to any disclaimer, the term of this patent is extended or adjusted under 35 U.S.C. 154(b) by 43 days.

(21) Appl. No.: 15/959,359

(22) Filed: Apr. 23, 2018

(65) Prior Publication Data

US 2019/0325614 A1   Oct. 24, 2019

(51) Int. Cl.
| | |
|---|---|
| G06T 9/00 | (2006.01) |
| G06T 9/40 | (2006.01) |
| G06T 17/00 | (2006.01) |
| H04N 19/94 | (2014.01) |
| H04N 19/597 | (2014.01) |

(52) U.S. Cl.
CPC ............... G06T 9/40 (2013.01); G06T 9/001 (2013.01); H04N 19/94 (2014.11); *G06T 17/005* (2013.01); *H04N 19/597* (2014.11)

(58) Field of Classification Search
CPC ......... G06T 17/005; G06T 9/40; G06T 9/001; H04N 19/597; H04N 19/94
See application file for complete search history.

(56) References Cited

U.S. PATENT DOCUMENTS

2004/0217956 A1* 11/2004 Besl ...................... G06T 15/205
                                                                    345/419
2017/0347122 A1* 11/2017 Chou .................... G06T 17/005

* cited by examiner

*Primary Examiner* — Kenny A Cese
(74) *Attorney, Agent, or Firm* — Campbell C. Chiang; Patterson & Sheridan LLP

(57) ABSTRACT

Aspects of the present disclosure provide a method for compressing a point cloud. The method includes determining a sub-division technique for the volume based on one or more numbers derived from a distribution of points in the volume, dividing the volume into a number of sub-volumes according to the sub-division technique, and determining whether each sub-volume of the sub-volumes is occupied by at least one point. The method includes generating a bit sequence for the volume comprising a control code that is based on the sub-division technique and an occupancy indicator that indicates whether or not each sub-volume is occupied by at least one point.

20 Claims, 4 Drawing Sheets

COMPRESSION OF POINT CLOUDS VIA A NOVEL HYBRID CODER

TECHNICAL FIELD

Certain aspects of the present disclosure generally relate to compression techniques and, more particularly, to improved techniques for compressing point clouds, such as within a vector streaming system.

BACKGROUND

In vector streaming, a visible scene to be rendered for display on a client device is generally encoded as two separate streams: a shaded atlas (e.g., information about all visible surfaces derived from surface textures, scene illumination and viewer's vantage point), and geometry/mesh information about the visible scene (e.g., all visible triangles represented as a group of vertices and their connectivity information). Such scene representation aids in efficient and latency-resilient warping on a client device. For example, in a virtual reality or augmented reality system, a portion of the information describing graphical objects to be rendered for display may be represented as point clouds (e.g., a plurality of points or vertices). A point cloud may be encoded at a server using its compressed representation. Separately, a shaded atlas corresponding to the encoded point cloud is also encoded using still image or video encoding techniques. This combined encoded information may be transmitted to a client device to be decoded, rendered, and warped for display.

OctTree encoding is a lossy compression technique in which a point cloud is encoded or compressed by defining a volume that encompasses the point cloud and dividing the volume into eight sub-volumes. It is then determined whether or not each sub-volume is occupied by at least one point of the point cloud. Occupied sub-volumes are further sub-divided into eight smaller sub-volumes. This process is repeated until a certain condition is met, such as a certain depth (e.g., number of sub-divisions) being reached, at which point the OctTree encoding process may be completed. Ideally, if enough number of levels are allowed to represent the smallest distances between vertices in a point cloud, the entire point cloud can be represented as an organized occupancy map of the OctTree. Compression is lossy since a vertex is then decoded/reconstructed as the centroid of the leaf sub-volume in which the vertex is found to reside. The words vertex, point and element of a point cloud are used interchangeably to describe the same concept—a vertex in a 3D mesh describing the geometry of a scene.

Continuing to recursively perform OctTree sub-division techniques until a specified depth is reached may be limited in terms of efficiency. As such, there is a need in the art for improved techniques for compressing point clouds.

SUMMARY

Certain aspects of the present disclosure provide a method for compressing a point cloud. The method includes defining a volume that comprises a plurality of points of the point cloud. The method includes determining a sub-division technique for the volume based on one or more numbers derived from a distribution of points in the volume. The method includes dividing the volume into a number of sub-volumes according to the sub-division technique. The method includes determining whether each sub-volume of the sub-volumes is occupied by at least one point. The method includes generating a bit sequence for the volume comprising: a control code that is based on the sub-division technique; and an occupancy indicator that indicates whether or not each sub-volume is occupied by at least one point.

Certain aspects of the present disclosure provide a computer system comprising a processor configured to perform a method for compressing a point cloud. The method includes defining a volume that comprises a plurality of points of the point cloud. The method includes determining a sub-division technique for the volume based on one or more numbers derived from a distribution of points in the volume. The method includes dividing the volume into a number of sub-volumes according to the sub-division technique. The method includes determining whether each sub-volume of the sub-volumes is occupied by at least one point. The method includes generating a bit sequence for the volume comprising: a control code that is based on the sub-division technique; and an occupancy indicator that indicates whether or not each sub-volume is occupied by at least one point.

Certain aspects of the present disclosure provide a non-transitory, computer readable medium having instructions stored thereon. Execution of the instructions by a computing system causes the computing system to carry out a method for compressing a point cloud. The method includes defining a volume that comprises a plurality of points of the point cloud. The method includes determining a sub-division technique for the volume based on one or more numbers derived from a distribution of points in the volume. The method includes dividing the volume into a number of sub-volumes according to the sub-division technique. The method includes determining whether each sub-volume of the sub-volumes is occupied by at least one point. The method includes generating a bit sequence for the volume comprising: a control code that is based on the sub-division technique; and an occupancy indicator that indicates whether or not each sub-volume is occupied by at least one point.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
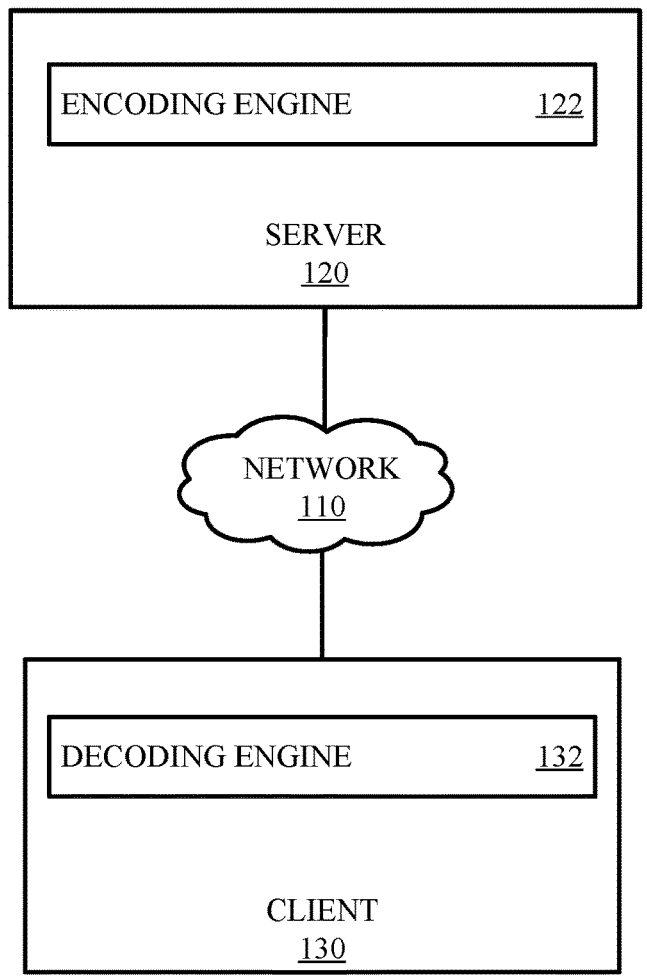
FIG. 1 illustrates an example of a computing environment in which improved techniques for compression of point clouds may be employed.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Embodiments of the present disclosure relate to improved techniques for compression of point clouds, such as in vector streaming systems. For example, three-dimensional graphical object data (e.g., a digital 3D object) may be represented by a plurality of triangles organized in a 3D mesh. A shaded atlas (e.g., information about all visible surfaces derived from surface textures, scene illumination, and viewer's vantage point) may represent textures for the plurality of triangles based on lighting, camera position, and the like. Geometry information (e.g., information about the triangles themselves) may be represented, at least in part, by a point cloud (e.g., comprising a plurality of points, which represent triangle vertices). Techniques described herein relate in particular to processes for encoding or compressing point clouds for transmission to client devices.

In certain embodiments, a three-dimensional volume may be defined that encompasses the point cloud. A first sub-division technique may be determined for the volume. For example, a determination may be made as to whether a default sub-division technique or an alternative sub-division technique is likely to be more efficient based on a distribution of points in the sub-volume. In one embodiment, estimated efficiency of a sub-division technique is determined based on entropy (e.g., randomness in distribution) of points such that a sub-division technique has a higher estimated efficiency if it is estimated to produce a lower amount of entropy in point distribution after it has been performed.

The volume may be sub-divided into a certain number of sub-volumes using the first sub-division technique (e.g., eight equally-sized sub-volumes according to an OctTree sub-division technique). It is then determined whether or not each sub-volume is occupied by at least one point of the point cloud (e.g., whether at least one point is located within the sub-volume). A bit sequence is generated for the volume including an occupancy indicator (e.g., a series of bits that indicate whether or not each sub-volume is occupied). In some embodiments, the bit sequence for the volume further includes a control code that is based on the first sub-division technique. For example, the control code may indicate that OctTree sub-division (or another sub-division technique) was used to encode the volume. The control code may be used by the client device to appropriately decode the volume.

Rather than repeating the same sub-division technique (e.g., OctTree sub-division) for each sub-volume, embodiments of the present disclosure involve dynamically determining a sub-division technique to use for each sub-volume, such as based on a distribution of points in the sub-volume. For example, a determination may be made as to whether the first sub-division technique (e.g., which may be a default sub-division technique) or an alternative sub-division technique is likely to be more efficient based on a distribution of points in the sub-volume. In one embodiment, estimated efficiency of a sub-division technique is determined based on entropy (e.g., randomness in distribution) of points such that a sub-division technique has a higher estimated efficiency if it is estimated to produce a lower amount of entropy in point distribution after it has been performed. Alternatively, an estimated number of bits needed to encode the points contained in a sub-volume using two or more different sub-division techniques may be compared, and a sub-division technique which minimizes the required bit description is chosen and signaled by setting an appropriate control code.

Each sub-volume may be divided into a number of second sub-volumes (e.g., which may be equally-sized) according to the sub-division technique determined for the sub-volume, and an occupancy of each second sub-volume may be determined. A bit sequence may be generated for each sub-volume including an occupancy indicator that indicates whether each second sub-volume of the sub-volume is occupied. The bit sequence for each sub-volume may further include a control code chosen based on the sub-division technique for sub-volume. For example, a control code for a sub-volume may indicate whether a default sub-division technique (e.g., the first sub-division technique, which may be OctTree sub-division) is used to encode the sub-volume or whether a different sub-division technique is used to encode the sub-volume.

Note that each subsequent subdivision effectively ads one bit of precision to each dimension of the encoded vertices. When OctTree technique is used to divide a sub-volume, all the vertices present in this sub-volume appear described at slightly higher precision as a result of encoding the information of the sub-volume occupancy. More specifically, OctTree-encoding one sub-volume information is equivalent to adding one bit of precision to each dimension of the vertices present in the said sub-volume. Thus, if in the encoding process one branch of the encoding structure is obtained using pure uniform OctTree sub-divisions, one can say that all the vertices contained in such sub-volume obtained at level T of the OctTree have thus far been described with T bits of precision per each dimension (x,y,z). Therefore, there is a duality between the depth of the OctTree and the resulting quantization loss of vertex encoding. Consequently, one can specify either the desired number of OctTree levels or the desired precision (bitwidth) assigned to each vertex in the encoding process, with those to representations being equivalent.

Besides the described sub-division techniques, in some cases it may be decided that a vertex is more efficiently encoded continuing its representation using a uniform quantization to describe the residual position of this vertex within the sub-volume, instead of dividing the sub-volume further. Such decision can be made based on several factors, including: the number of remaining vertices in a sub-volume, n, the total desired precision of encoded vertices (total number of bits per vertex dimension), K, the current level in the OctTree, T, at which the sub-volume in question is located, as well as the number of bits needed to represent various control codes.

For example, consider encoding vertices at desired precision of K bits and subdividing the original volume T times before it was determined that one of the resulting sub-volumes at depth T only contains n vertices. One option to encode the n vertices at a desired precision is to sub-divide the sub-volume an additional K-T times, which results in an additional $A_{K-T}=(K-T)\cdot(OC_{def}+C_{def})$ bits, where $OC_{def}$ is the length of the occupancy code (e.g., occupancy indicator) for the default subdivision, which equals 8 for OctTree subdivision, and $C_{def}$ is the length of the default control code (for example: 1). At another extreme, the said vertices may be encoded by allocating K-T bits to uniformly encode each of the three dimensions of the vectors drawn from the sub-volume origin to each vertex position within this sub-volume. This is shown and described with respect to FIG. 2 (e.g., with respect to items 272 and 274 of FIG. 2). This strategy requires $B_{K-T}=C_{uni}+C_{numPts}+n\cdot(K-T)\cdot 3$ bits, where $c_{uni}$ is the number of bits required to represent the "uniform quantization" control code (item 282 in FIG. 2), and $C_{numPts}$ is the number of bits allocated for portraying the number of vertices to be uniformly-quantized within a sub-volume (item 284 in FIG. 2). Note that $C_{numPts}$ also decides the maximum number of vertices present in a sub-volume at a moment when it is decided to switch from a default subdivision strategy to uniform quantization; more precisely, the maximum sub-volume occupancy which can still be encoded uniformly is $2^{C_{numPts}}$. Finally, a third strategy may be to continue OctTree sub-dividing the sub-volume one more level, and then resort to uniform quantization of all n vertices. This strategy requires $C_{K-T}=OC_{def}+C_{def}+x\cdot B_{K-T-1}$, where x is the number of non-empty second sub-volumes dividing the sub-volume at depth T.

Whether OctTree subdivisions are continued, or the strategy is changed to uniform quantization of the residual vectors 274 may in one embodiment be decided by computing $A_{K-T}$ and $B_{K-T}$ as described above and proceeding with the strategy which requires fewer bits to finalize. In another embodiment the decision is based on the comparison between $C_{K-T}$ and $B_{K-T}$, as described above. In both cases the OctTree subdivisions are discontinued and uniform quantization is applied to the sub-volume in question if entity $B_{K-T}$ is smaller than the other entity being compared. In other implementations the decision as to which subdivision/quantization strategy to employ next in a given sub-volume involves analyzing the possible quantization strategies to move from level T to level T+1 and greedily minimizing the required number of bits to represent such transition. In still other implementations, the optimum sequence of remaining quantization strategies is determined jointly in order to minimize the combined code bit length required to represent the transition from sub-volume at level T to encoding all the vertices therein with the desired K bits of precision per dimension.

This process (e.g., dividing sub-volumes into smaller sub-volumes according to determined sub-division techniques) may be continued until a certain condition is met (e.g., when a particular depth is reached, when each point of the point cloud is contained within a separate sub-volume, or the like). The bit sequences for the volume and each sub-volume are then sent to the client device. The client device decodes the bit sequences for the volume and each sub-volume according to the sub-division technique used for each (e.g., based on the control code of each) in order to reconstruct the point cloud. The client device may then perform rendering, warping, and/or the like (e.g., which may also be based on separately encoded texture information and/or connectivity information that is received and decoded by the client device) in order to prepare the graphical object for display. For example, the graphical object may be displayed within a virtual reality or augmented reality application accessed by a user of the client device.

It is noted that, while certain embodiments are described with respect to vector streaming systems, the techniques for compressing point clouds described herein may be used in other suitable systems with or without a streaming/transmission component to them.

Techniques described herein constitute a significant improvement with respect to conventional industry practices, as they allow for objects represented by point clouds to be encoded dynamically, and therefore more efficiently than do conventional techniques. Dynamically selecting sub-division or quantization techniques for encoding each sub-volume, rather than repeating the same sub-division technique until a certain depth is reached, allows for more efficient usage of system resources, such as processing and storage resources, at both the encoding device and the decoding device (e.g., a client device). Additionally, embodiments of the present disclosure may reduce network bandwidth by transmitting data from a server to a client device in a more compressed form. Accordingly, embodiments of present disclosure improve the functioning of computer systems by reducing a load on processing and network resources, avoiding bottlenecks, and the like. Furthermore, techniques described herein improve a user experience by providing quicker vector streaming and ensuring availability of system resources for other tasks related to the user experience (e.g., rendering content, processing user input, and the like).

FIG. 1 illustrates an example of a computing environment 100 in which improved techniques for compression of point clouds may be employed. Computing environment includes a server 120 and a client 130, which are connected through a network 110, such as the internet. There may be a wired or wireless connection between server 120 and client 130 (e.g., WiFi, Wireless Local Area Network (WLAN), Local Area Network (LAN), Core-Division Multiple Access (CDMA), Long Term Evolution (LTE), 5G, New Radio (NR), Universal Serial Bus (USB), or the like).

Server 120 may be a physical or virtual computing device, such as a server, desktop computer, laptop computer, virtual machine, or the like. In certain embodiments, server 120 comprises a portion of a client-server vector streaming system, where server 120 encodes graphical object data represented by point clouds for transmission to client 130, which decodes, renders, and warps the graphical object data for display.

Server 120 comprises an encoding engine 122 that performs operations related to improved compression of point clouds according to embodiments of the present disclosure. Encoding engine 122 may, for example, be a digital signal processor (DSP), central processing unit (CPU), integrated circuit (IC), field programmable gate array (FPGA), or the like. For example, encoding engine 122 may define a volume that encompasses a point cloud representing a graphical object and determine a sub-division technique for the volume (e.g., based on estimated efficiencies of sub-division techniques). and Encoding engine 122 may divide the volume into a number of sub-volumes according to the sub-division technique (e.g., OctTree sub-division, sometimes referred to as Octree or OctTree encoding). Encoding engine 122 may determine an occupancy of each sub-volume and generate bit sequence comprising an occupancy indicator for the volume that indicates whether each sub-volume is occupied and, in some cases, a control code that indicates the sub-division technique used to encode the volume.

Encoding engine 122 may determine a sub-division technique for each sub-volume (e.g., based on estimated efficiencies of sub-division techniques), and may divide each sub-volume into smaller sub-volumes according to the determined sub-division technique for the sub-volume. Encoding engine may determine an occupancy of the smaller sub-volumes of each sub-volume and generate a bit sequence comprising an occupancy indicator for each sub-volume that indicates whether each of the smaller sub-volumes is occupied. The bit sequence for each sub-volume may further include a control code that is based on the sub-division technique used to encode the sub-volume.

Sub-division/quantization techniques may include such techniques as OctTree encoding of points in a volume, or quadtree encoding of points which are well approximated by a fitted plane, or uniform quantization of the residual vectors, and the like. Uniform quantization in this scope generally refers to a process of approximating a number (or a sequence of numbers) given in the original precision N by a number (or a sequence of numbers) given at a lower precision K. In one embodiment, the input precision N is given by 32-bit floating point arithmetic, whereas the desired quantized precision may be a K-bit fixed point representation, where K can be any number less than 32, but in practice numbers in a range between 8 and 15 may be sufficient in many applications.

Certain sub-division techniques may be combinations of other techniques. For example, one dimension of a three-dimensional volume or sub-volume may be uniformly quantized, and the remaining two dimensions may be subdivided into m×n uniform blocks using a quadtree-like technique. This may be useful if the vertices in a volume approximately reside on a planar surface parallel to one of the sides of the volume. In one example, a plane equation (e.g. four floating-point numbers) may be encoded using uniform quantization, and then the represented plane may be sub-divided into m×n uniform blocks using a quadtree-like technique to encode vertices lying on an arbitrary plane in a volume. In these examples, the occupancy indicator of the m×n subdivision can be generated using m×n bits (similarly to how occupancy indicators for OctTree sub-division, which is 2×2×2 sub-division, may be generated using eight bits, each bit indicating whether or not one of the eight sub-volumes is occupied).

In some embodiments, sub-division techniques may be selected from a group of sub-division techniques that are applicable to a particular point cloud. For example, certain techniques, such as specialized planar-distribution encoding, are more applicable to encoding point clouds of man-made structures, and far less applicable to encoding point clouds from natural scenery. As such, these techniques may not be included in a group of applicable sub-division techniques for a point cloud depicting natural scenery.

An occupancy indicator for a volume or sub-volume may, in some embodiments, include a bit for each sub-volume into which the volume or sub-volume has been divided. For example, the bit may be a zero if the sub-volume is not occupied, while the bit may be a one if the sub-volume is occupied by at least one point.

Each occupancy indicator may further include a control code that is based on the sub-division/quantization technique used to further represent the points within the volume or sub-volume. In some embodiments, the control code only indicates whether or not a previously used sub-division technique is maintained or changed to another sub-division technique. In other embodiments, the control code indicates a particular sub-division technique that is selected from a pre-defined set of possible techniques. Control codes may be assigned to sub-division techniques such that the most commonly used sub-division techniques require the fewest number of bits. For example, if the same sub-division technique used to derive a sub-volume (e.g., OctTree sub-division, which may be a default sub-division technique in some embodiments) is used to divide the sub-volume, this may be represented by a control code of "0". If a different common sub-division technique (e.g., uniform quantization) is used instead of the same sub-division technique, this may be represented by a control code of "10". Less common cases may be represented by control codes comprising more bits. For example, if neither OctTree sub-division nor uniform quantization is used, the control code may be "11x", where "11" represents that a different sub-division technique than the two most common techniques is to be used, and "x" is another binary code that represents the different sub-division technique. It is noted that these examples are only included for demonstrative purposes, and are in no way limiting. A control code may comprise any type of indicator that is capable of conveying information about a sub-division technique.

In some embodiments, common entropy coding techniques such as Huffman coding may be used to associate control codes with sub-division techniques. For example, a Huffman coding technique may be used to assign control codes to sub-division techniques such that the number of bits of a control code is roughly inversely proportional to the likelihood of the corresponding sub-division technique being used in the dataset (e.g., the scene comprising the point cloud) of interest.

In alternative embodiments, no control code is included in an occupancy indicator of a sub-volume if the same sub-division technique used to derive the sub-volume (or, in some cases, a default sub-division technique) is also used to divide the sub-volume. In these embodiments, a control code is only included if a different sub-division technique is used. In certain embodiments, the control code may comprise an escape code that indicates that a particular different sub-division technique is to be used (e.g., an escape code that always indicates that uniform quantization is used rather than a default sub-division technique, such as OctTree sub-division). Such schemes can support only two different sub-division/quantization techniques: the default is assumed by default and requires no control code, and the other designated alternative technique is assumed far less likely and required a so-called escape code in lieu of a control code. In one embodiment, OctTree quantization is used as a default sub-division method and each sub-volume is further represented only using 8-bit occupancy pattern, whereas the alternative sub-division/quantization technique is encoded using a '00000000' escape code, which is unique since there can be no all-zero occupancy indicator.

Once encoding engine 122 has finished compressing a point cloud according to techniques described herein, server 120 may send the bit sequences for the volume and each sub-volume to client 130.

Client 130 may be a computing device, such as a mobile device, laptop computer, tablet, virtual reality or augmented reality device, or the like. In some embodiments, client 130 comprises a wearable display through which a user views and interacts with a virtual reality or augmented reality application. In certain embodiments, client 130 comprises a client-side portion of a client-server vector streaming system, where server 120 encodes graphical object data represented in part by point clouds for transmission to client 130, which decodes, renders, and warps the graphical object data for display.

Client 130 comprises a decoding engine 132, which performs operations related to decoding graphical object data. Decoding engine 132 may, for example, be a digital signal processor (DSP), central processing unit (CPU), integrated circuit (IC), field programmable gate array (FPGA), or the like. For example, decoding engine 132 may receive the bit sequences (e.g., representing the compressed point cloud) for the volume and each sub-volume from server 120, and may decode the bit sequences in order to reconstruct the point cloud. Decoding engine 132 may use control codes to determine a decoding method for each bit sequence. For example, if a control code of a bit sequence indicates that the sub-volume represented by the bit sequence was divided using a particular sub-division technique (e.g., OctTree, uniform quantization, or the like), decoding engine 132 decodes the bit sequence accordingly (e.g., according to OctTree decoding techniques, uniform quantization decoding techniques, or the like). Once client 130 has fully reconstructed the point cloud by decoding the bit sequences, client 130 may perform rendering and warping (e.g., further based on texture information and/or connectivity information received separately from server 120) in order to display the graphical object.

It is noted that, while client 130 and server 120 are shown in FIG. 1 as separate devices, encoding and decoding functions may alternatively be performed on the same device. Embodiments of the present disclosure are not limited to client-server architectures.

Figure 2:
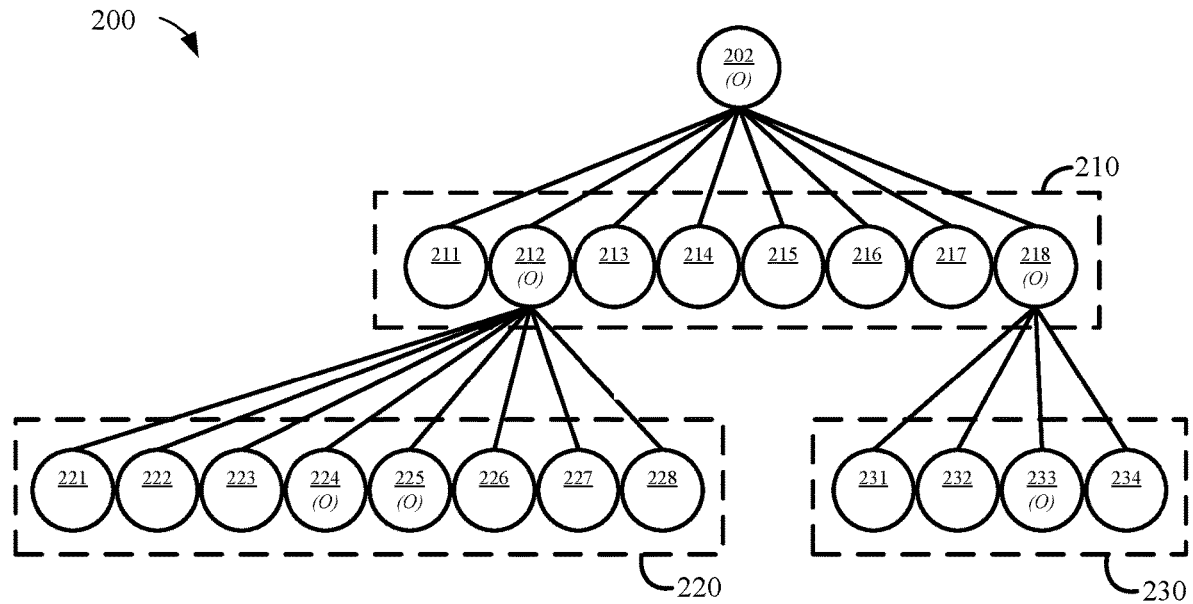
FIG. 2 illustrates an example related to improved techniques for compression of point clouds according to embodiments of the present disclosure.

FIG. 2 illustrates an example 200 related to improved techniques for compression of point clouds according to embodiments of the present disclosure.

Example 200 includes a root node 202 of a tree that represents a process of encoding a point cloud. Root node 202 may, for example, represent a three-dimensional volume that is defined to encompass the point cloud. Root node 202 is depicted with an "(O)", which indicates that root node 202 is occupied by at least one point.

At stage 210, the volume represented by root node 202 is divided according to an OctTree sub-division technique into eight sub-volumes that are represented by nodes 211-218. For example, OctTree sub-division may be a default sub-division technique, and may have determined to be the most efficient sub-division technique for the volume (e.g., based on estimated efficiencies of sub-division techniques). Nodes 212 and 218 include an "(O)", indicating that they are each occupied by at least one point, while the other nodes 211 and 213-217 are not occupied.

Bit sequence 240 comprises an occupancy indicator for the volume represented by root node 202. Bit sequence 240 comprises the eight-bit occupancy indicator "01000001", each bit of which indicates whether or not a sub-volume of the volume (all of which are represented by nodes 211-218) is occupied. Because bit sequence 240 represents the topmost volume, rather than a sub-volume, it does not include a control code. It is noted that, in some embodiments, bit sequence 240 may include a control code.

For each occupied sub-volume, represented by nodes 212 and 218, additional operations are performed, including determining a sub-division technique, dividing the sub-volume represented by the node, and generating a bit sequence for the node.

For node 212, it is determined that OctTree sub-division should be used again. For example, this determination may be based on a distribution of points in the sub-volume represented by node 212. In one particular embodiment, this determination is based on whether or not the sub-volume comprises fewer or more than $2^{C_{numPts}}$ points. In another embodiment the determination can additionally consider the special distribution of points if there are more than $2^{C_{numPts}}$ points in the said sub-volume.

For node 212, it is determined that OctTree sub-division is better suited than any alternative technique. Accordingly, at stage 220, node 212 is further divided into eight sub-volumes that are represented by nodes 221-228. Nodes 224 and 225 include an "(O)", indicating that they are occupied, while the other nodes 221-223 and 226-228 are not occupied.

Bit sequence 250 comprises an occupancy indicator for the sub-volume represented by node 212. Bit sequence 250 comprises the eight-bit occupancy indicator "00011000", each bit of which indicates whether or not a sub-volume of the sub-volume (all of which are represented by nodes 221-228) is occupied. Bit sequence 250 further comprises control code 252, which indicates (e.g., via the binary code "0") that the same sub-division technique used to derive the sub-volume represented by node 212 (e.g., OctTree sub-division) was used to divide the sub-volume represented by node 212.

For node 218, it is determined that a different sub-division technique (e.g., planar quadtree sub-division) should be used. For example, this determination may be based on a distribution of points in the sub-volume represented by node 218. In one particular embodiment, allowed sub-division techniques include quadtree-like encoding of points which can be approximated to reside on one of M pre-determined planes. Examples may include x=0 plane, y=0 plane, z=0 plane and a diagonal plane traversing pre-determined vertices of the given sub-volume. If the spatial distribution of points within sub-volume corresponding to node 218 is sufficiently well approximated by one of the given planes, the sub-division technique may be switched to m-by-n planar or quadtree sub-division.

Bit sequence 260 comprises an occupancy indicator for the sub-volume represented by node 218. Bit sequence 260 comprises the four-bit occupancy indicator "0010", each bit of which indicates whether or not a sub-cell in a quadtree suitable for node 218 is occupied. Bit sequence 260 further comprises control code 262, which indicates (e.g., via the binary code "10") that a sub-division technique (e.g., 2×2 planar subdivision) different from the sub-division technique used to derive the sub-volume represented by node 218 (e.g., OctTree sub-division) was used to divide the sub-volume represented by node 218. Further, in this particular example of planar subdivision of points, it is also needed to specify which plane is being used to approximate spatial distribution of points in the sub-volume corresponding to node 218. This plane is encoded by field 264 which in this example allows for specifying up to 4 different planes (due to 2 bits used).

To further illustrate various sub-division/quantization techniques, suppose that for node 224 it is determined that only two vertices reside in the corresponding sub-volume 270 (shown in illustration 290), and suppose it was thus decided that uniform quantization of the remaining vertices is the optimum next strategy. In general, the number of points contained in the sub-volume may be compared to a given threshold $2^{C_{numPts}}$ and uniform quantization may be used as long as the number is below the threshold. In other embodiments estimated bit-lengths $A_{K-T}$, $B_{K-T}$ and/or $C_{K-T}$ may be computed to determine whether uniform quantization of the remaining vertices or further sub-divisions of the sub-volume lead to a smaller estimated bit length, whereupon the technique is chosen such that the estimated required bit-length is shorter.

The two remaining points 272 and 273 contained in the sub-volume 270 which are to be encoded using uniform quantization are shown in illustration 290 of FIG. 2. Consider one of the points, 272 and the vector 274 drawn from the sub-volume origin to the point 272. It is this vector 274 that is to be uniformly quantized using K-T bits in order to satisfy the original compression quantization requirement (bit budget) K. In this example, T=2 and K=8. Bit sequence 280 contains three uniform quantization components: 286($x$) (for x-dimension of the vector 274), 287($y$) (for y-dimension of the vector 274), and 288($z$) (for z-dimension of the vector 274). These are all obtained by quantizing a corresponding dimension of the residual vector 274 (given in 32-bit floating point arithmetic) using K-T=6 bit fixed point values obtained by subdividing the sub-volume 270 into $(K-T)^3$ uniform cubes and determining which sub-cube contains the given point 272. While the uniform quantization components 286($x$), 287($y$), and 288($z$) of bit sequence 280 do not necessarily indicate occupancy, it is noted that certain descriptions herein with respect to occupancy indicators are also applicable to quantization components 286($x$), 287($y$), and 288($z$). In other words, when the sub-division strategy for a volume or sub-volume is uniform quantization, the "occupancy indicator" for the volume or sub-volume may in some instances refer to a set of uniform quantization components rather than a sequence of bits that indicate occupancy.

Bit sequence 280 also contains two additional fields 282 and 284. Field 282 is the designated control code ('11' in this case) to describe the uniform quantization technique. Field 284 describes the number of points to be uniformly-encoded in the given sub-volume 270. In order to further preserve bits in this representation, we actually insert a binary representation of the (# points_in_sub-volume−1), since we know that the sub-volume cannot be empty (zero points is not an option). Thus in this example, field 284 equals a binary representation of "1" using $C_{numPts}$ bits, i.e., '001' for $C_{numPts}$=3. Note that fields 282 and 284 need to be inserted only once per sub-volume 270, and are followed by binary representations of x, y, and z dimensions for each of the points contained in 270.

The process depicted at stages 210, 220, and 230, and illustration 290, may be repeated and additional bit sequences may be generated until a certain condition is reached, such as when a certain depth is reached.

Bit sequences 240, 250, and 260 (as well as any other bit sequences, not shown, that are subsequently generated) are sent to a client device, which reconstructs the point cloud by decoding the bit sequences in view of the control codes (e.g., control codes 252 and 262).

It is noted that the sub-division techniques shown in example 200 are only included for demonstrative purposes, and other sub-division techniques may be employed without departing from the scope of the present disclosure. Furthermore, methods of determining sub-division techniques for sub-volumes are not limited to those discussed. For example, sub-division techniques for sub-volumes may be determined by different methods involving estimating efficiencies of different sub-division techniques based on distributions of points within the sub-volumes.

Figure 3:
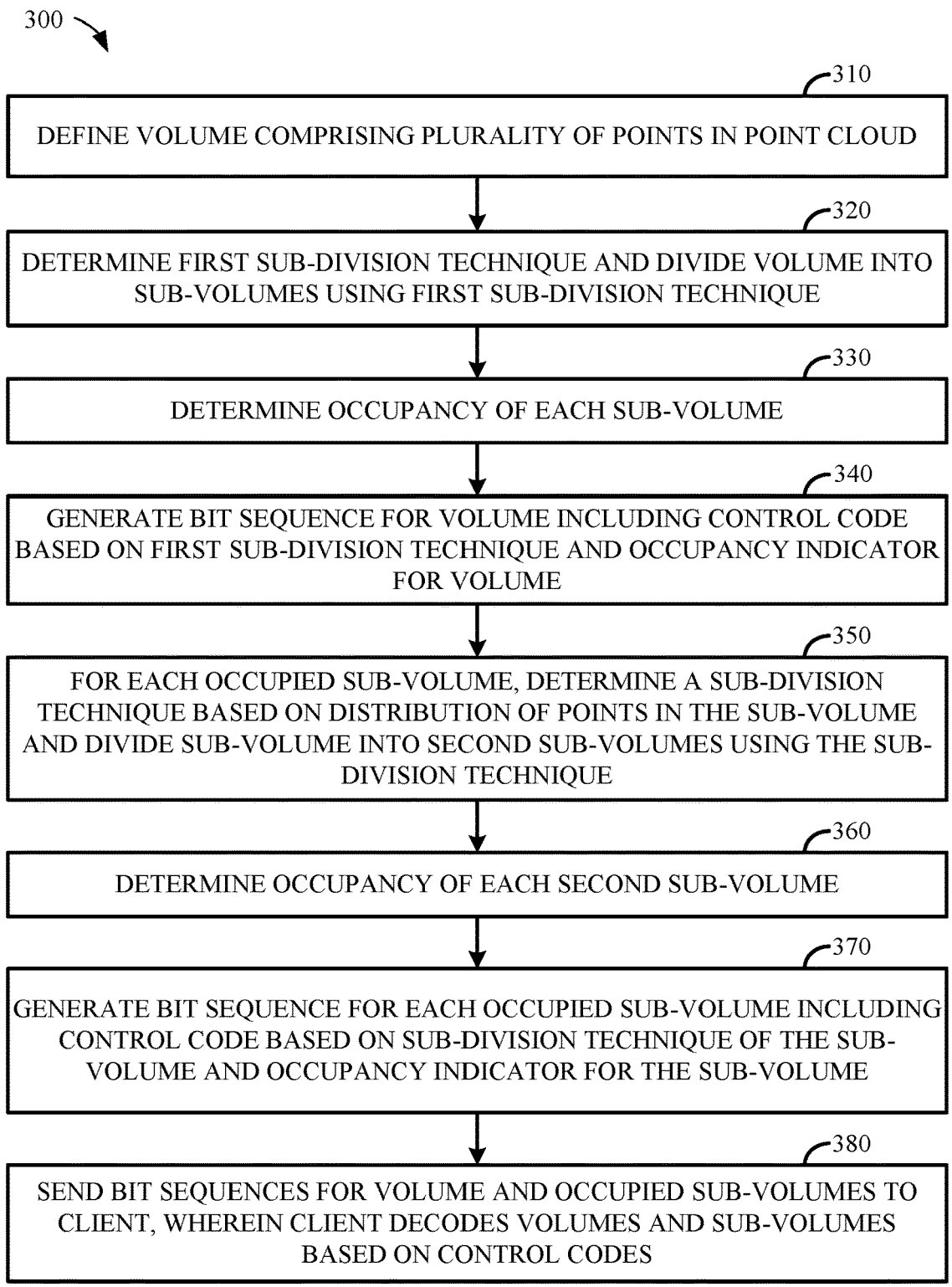
FIG. 3 illustrates example operations for performing improved techniques for compression of point clouds according to embodiments of the present disclosure.

FIG. 3 illustrates example operations 300 for performing improved techniques for compression of point clouds according to embodiments of the present disclosure. Operations 300 may, for example, be performed by encoding engine 122 of FIG. 1.

Operations begin at step 310, where a volume is defined that comprises a plurality of points in a point cloud.

At step 320, a first sub-division technique is determined for the volume (e.g., based on estimated efficiencies of potential sub-division techniques), and the volume is divided into sub-volumes using the first sub-division technique. In one embodiment, the sub-division technique is determined by estimating efficiencies of different sub-division techniques (e.g., based on how well each sub-division technique would minimize entropy of point distribution) and choosing the sub-division technique with the highest estimated efficiency. In some embodiments, the first sub-division technique comprises OctTree sub-division.

At step 330, occupancy of each sub-volume is determined. For example, it is determined whether or not each sub-volume is occupied by at least one point.

At step 340, a bit sequence is generated for the volume that includes a control code based on the first sub-division technique and an occupancy indicator that indicates whether or not each sub-volume is occupied by at least one point. In other embodiments, the bit sequence for the volume does not include a control code.

At step 350, for each sub-volume, a sub-division technique is determined based on a distribution of points in the sub-volume and the sub-volume is divided into second sub-volumes using the sub-division technique. In one embodiment, the sub-division technique is determined by estimating efficiencies of different sub-division techniques (e.g., based on whether or not the sub-volume comprises fewer or more than $2^{C_{numPts}}$ points, or another similar calculation) and choosing the sub-division technique with the highest estimated efficiency.

At step 360, occupancy of each of the second sub-volumes is determined. For example, it is determined whether or not each second sub-volume is occupied by at least one point.

At step 370, a bit sequence is generated for each occupied sub-volume including a control code based on the sub-division technique and an occupancy indicator that indicates whether or not each second sub-volume of the sub-volume is occupied by at least one point.

At step 380, the bit sequences for the volume and each sub-volume are sent to a client device. The client device may receive and decode the bit sequences based on the control codes. For example, the client device may use a decoding technique for each bit sequence that corresponds to the sub-division technique indicated by the control code in the bit sequence.

Figure 4:
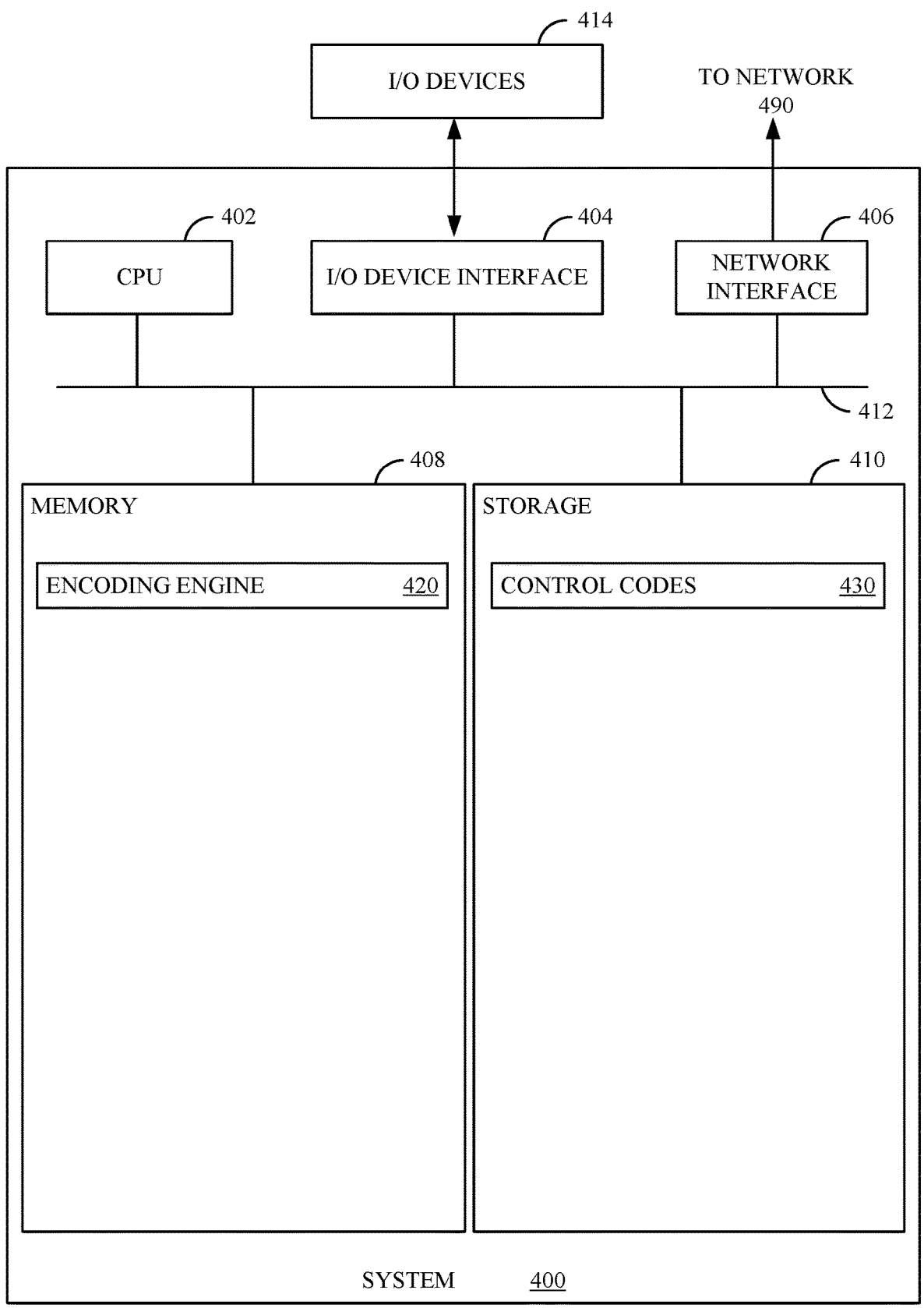
FIG. 4 illustrates an embodiment of a computer system with which aspects of the present disclosure may be implemented.

FIG. 4 illustrates an example system 400 with which aspects of the present disclosure may be implemented. For example, system 400 may be representative of server 120 in FIG. 1.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 is included to be representative of a single CPU, multiple CPUs, a single CPU having multiple processing cores, and the like. Additionally, the memory 408 is included to be representative of a random access memory. Furthermore, the storage 410 may be a disk drive, solid state drive, or a collection of storage devices distributed across multiple storage systems. Although shown as a single unit, the storage 410 may be a combination of fixed and/or removable storage devices, such as fixed disc drives, removable memory cards or optical storage, network attached storage (NAS), or a storage area-network (SAN).

Storage 410 comprises control codes 430, which may comprise a plurality of control codes that are associated with sub-division techniques. For example, each of a plurality of control codes 430 may be stored in association with a particular sub-division technique.

As shown, memory 408 includes encoding engine 420, which may perform operations related to improved techniques for compression of point clouds according to embodiments of the present disclosure (e.g., functionality described above with respect to FIGS. 1-4). For example, encoding engine 420 may compress a point cloud by recursively sub-dividing a volume comprising the point cloud according to dynamically determined sub-division techniques (e.g., determined based on distributions of points within sub-volumes). Encoding engine 420 may generate bit sequences for volumes and sub-volumes that indicate whether sub-volumes of the volumes and sub-volumes are occupied. Encoding engine 420 may further include control codes in bit sequences, the control codes indicating sub-division techniques.

Encoding engine 420 in memory 408 may communicate with other devices (e.g., clients) over a network 490 through network interface 406 (e.g., in order to transmit point clouds compressed into bit sequences).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for compressing a point cloud, the method comprising:
   defining a volume that comprises a plurality of points of the point cloud;
   determining an estimated efficiency of each respective sub-division technique of a set of possible sub-division techniques based on an estimated entropy in a distribution of points in the volume when the respective sub-division technique is performed;
   selecting a given sub-division technique from the set of possible sub-division techniques upon determining that the estimated efficiency of the given sub-division technique is higher than estimated efficiencies of one or more other sub-division techniques in the set of possible sub-division techniques, wherein each respective sub-division technique of the set of possible sub-division techniques is associated with a respective control code of a plurality of control codes;
   dividing the volume into a number of sub-volumes according to the given sub-division technique;
   determining whether each sub-volume of the sub-volumes is occupied by at least one point; and
   generating a bit sequence for the volume comprising: a given control code of the plurality of control codes that is associated with the given sub-division technique and indicates that the given sub-division technique was used to divide the volume; and an occupancy indicator that indicates whether or not each sub-volume is occupied by at least one point.

2. The method of claim 1, wherein the set of possible sub-division techniques comprises a default subdivision technique.

3. The method of claim 2, further comprising:
   determining a sub-division technique for a sub-volume of the sub-volumes based on one or more numbers derived from a distribution of points in the sub-volume;
   dividing the sub-volume into a number of second sub-volumes according to the sub-division technique for the sub-volume;
   generating a second bit sequence for the sub-volume comprising: a second control code that is based on the sub-division technique for the sub-volume; and a set of uniform quantization components comprising a sequence of bits that uniformly quantize a residual vertex location within the sub-volume for a plurality of dimensions, wherein the sub-division technique for the volume comprises OctTree encoding, and wherein the sub-division technique for the sub-volume comprises uniform quantization.

4. The method of claim 3, wherein determining the sub-division technique for the sub-volume comprises choosing between a default sub-division technique and uniform quantization so as to minimize a number of bits in a bit sequence for the sub-volume based on one or more parameters, wherein the one or more parameters include one or more of the following:
   a desired precision for compressing the point cloud;
   a level of the sub-volume determined based on how many sub-divisions have been performed to derive the sub-volume;
   a number of points in the sub-volume; and
   a number of bits in a control code corresponding to a default sub-division technique; and
   a number of bits in a control code corresponding to an alternative sub-division technique.

5. The method of claim 3, wherein determining the sub-division technique for the sub-volume comprises:
   determining a first number of bits for using a first sub-division technique by:
      determining a level of the sub-volume based on how many sub-divisions have been performed to derive the sub-volume;
      determining a desired precision for compressing the point cloud;
      calculating the first number of bits by subtracting the level of the sub-volume from the desired precision and multiplying the remainder by a sum of a number of bits required to encode the sub-volume into an occupancy indicator according to the first subdivision technique and a number of bits required to represent the first sub-division technique using a control code;
   determining a second number of bits for using a second sub-division technique by calculating a sum of:
      a number of bits required to encode the sub-volume into an occupancy indicator according to the second subdivision technique;
      a number of bits required to represent the second sub-division technique using a control code; and
      a product of:
         a number of points in the sub-volume; and
         a remainder determined by subtracting the level of the sub-volume from the desired precision; and
   choosing either the first sub-division technique or the second sub-division technique as the sub-division technique for the sub-volume based on which of the first number of bits and the second number of bits is smaller.

6. The method of claim 1, wherein the control code is associated with a decoding technique, and wherein a decoding component selects a decoding technique for the volume based on the control code of the volume.

7. The method of claim 1, wherein a length of the control code is chosen such as to minimize a bit overhead used for control information encoding in a scene comprising the point cloud.

8. The method of claim 7, wherein a plurality of sub-division techniques are ranked according to their prevalence in the scene, and wherein shorter control codes are used to describe sub-division techniques that are more prevalent in the scene.

9. The method of claim 7, wherein a default sub-division technique is OctTree sub-division, and wherein the default sub-division technique corresponds to a control code comprising one bit.

10. A computer system, comprising:
    a processor configured to perform a method for compressing a point cloud, the method comprising:
       defining a volume that comprises a plurality of points of the point cloud;

determining an estimated efficiency of each respective sub-division technique of a set of possible sub-division techniques based on an estimated entropy in a distribution of points in the volume when the respective sub-division technique is performed, selecting a given sub-division technique from the set of possible sub-division techniques upon determining that the estimated efficiency of the given sub-division technique is higher than estimated efficiencies of one or more other sub-division techniques in the set of possible sub-division techniques, wherein each respective sub-division technique of the set of possible sub-division techniques is associated with a respective control code of a plurality of control codes;

dividing the volume into a number of sub-volumes according to the given sub-division technique;

determining whether each sub-volume of the sub-volumes is occupied by at least one point; and generating a bit sequence for the volume comprising: a given control code of the plurality of control codes that is associated with the given sub-division technique and indicates that the given sub-division technique was used to divide the volume; and an occupancy indicator that indicates whether or not each sub-volume is occupied by at least one point.

11. The computer system of claim 10, wherein the set of possible sub-division techniques comprises a default subdivision technique.

12. The computer system of claim 11, wherein the method further comprises:

determining a sub-division technique for a sub-volume of the sub-volumes based on one or more numbers derived from a distribution of points in the sub-volume;

dividing the sub-volume into a number of second sub-volumes according to the sub-division technique for the sub-volume;

determining whether each second sub-volume of the second sub-volumes is occupied by at least one point;

generating a second bit sequence for the sub-volume comprising: a second control code that is based on the sub-division technique for the sub-volume; and a set of uniform quantization components comprising a sequence of bits that uniformly quantize a residual vertex location within the sub-volume for a plurality of dimensions, wherein the sub-division technique for the volume comprises OctTree encoding, and wherein the sub-division technique for the sub-volume comprises uniform quantization.

13. The computer system of claim 12, wherein determining the sub-division technique for the sub-volume comprises choosing between a default sub-division technique and uniform quantization so as to minimize a number of bits in a bit sequence for the sub-volume based on one or more parameters, wherein the one or more parameters include one or more of the following:

a desired precision for compressing the point cloud;

a level of the sub-volume determined based on how many sub-divisions have been performed to derive the sub-volume;

a number of points in the sub-volume; and a number of bits in a control code corresponding to a default sub-division technique; and a number of bits in a control code corresponding to an alternate sub-division technique.

14. The computer system of claim 12, wherein determining the sub-division technique for the sub-volume comprises:

determining a first number of bits for using a first sub-division technique by:

determining a level of the sub-volume based on how many sub-divisions have been performed to derive the sub-volume;

determining a desired precision for compressing the point cloud;

calculating the first number of bits by subtracting the level of the sub-volume from the desired precision and multiplying the remainder by a sum of a number of bits required to encode the sub-volume into an occupancy indicator according to the first subdivision technique and a number of bits required to represent the first sub-division technique using a control code;

determining a second number of bits for using a second sub-division technique by calculating a sum of:

a number of bits required to encode the sub-volume into an occupancy indicator according to the second subdivision technique;

a number of bits required to represent the second sub-division technique using a control code; and a product of:

a number of points in the sub-volume; and a remainder determined by subtracting the level of the sub-volume from the desired precision; and choosing either the first sub-division technique or the second sub-division technique as the sub-division technique for the sub-volume based on which of the first number of bits and the second number of bits is smaller.

15. The computer system of claim 12, wherein the occupancy indicator for the volume comprises a sequence of bits equal to the number of sub-volumes, and wherein the occupancy indicator for the sub-volume comprises a sequence of bits that uniformly quantize a residual vertex location.

16. The computer system of claim 10, wherein the control code is associated with a decoding technique, and wherein a decoding component selects a decoding technique for the volume based on the control code of the volume.

17. The computer system of claim 10, wherein a length of the control code is chosen such as to minimize a bit overhead used for control information encoding in a scene comprising the point cloud.

18. The computer system of claim 17, wherein a plurality of sub-division techniques are ranked according to their prevalence in the scene, and wherein shorter control codes are used to describe sub-division techniques that are more prevalent in the scene.

19. The computer system of claim 17, wherein a default sub-division technique is OctTree sub-division, and wherein the default sub-division technique corresponds to a control code comprising one bit.

20. A non-transitory computer readable medium having instructions stored thereon for compressing a point cloud, wherein execution of the instructions by a computing system causes the computing system to carry out the steps of:

defining a volume that comprises a plurality of points of the point cloud;

determining an estimated efficiency of each respective sub-division technique of a set of possible sub-division techniques based on an estimated entropy in a distribution of points in the volume when the respective sub-division technique is performed;

selecting a given sub-division technique from the set of possible sub-division techniques upon determining that the estimated efficiency of the given sub-division technique is higher than estimated efficiencies of one or more other sub-division techniques in the set of possible sub-division techniques, wherein the given sub-division technique is selected from: OctTree sub-division or uniform quantization;

dividing the volume into a number of sub-volumes according to the given sub-division technique;

generating a bit sequence for the volume such that:
- if the given sub-division technique for the volume is OctTree sub-division, the bit sequence comprises an occupancy indicator that indicates whether or not each sub-volume is occupied by at least one node;
- if the given sub-division technique for the volume is uniform quantization, the bit sequence comprises an escape code.

* * * * *